(12) United States Patent
Lindahl

(10) Patent No.: US 11,041,586 B2
(45) Date of Patent: Jun. 22, 2021

(54) SYSTEM AND METHOD FOR A HELICAL PRESSURE SNUBBER

(71) Applicant: THE BOEING COMPANY, Chicago, IL (US)

(72) Inventor: Gary M. Lindahl, Newcastle, WA (US)

(73) Assignee: The Boeing Company, Chicago, IL (US)

( * ) Notice: Subject to any disclaimer, the term of this patent is extended or adjusted under 35 U.S.C. 154(b) by 266 days.

(21) Appl. No.: 16/224,278

(22) Filed: Dec. 18, 2018

(65) Prior Publication Data

US 2020/0191313 A1 Jun. 18, 2020

(51) Int. Cl.
| | |
|---|---|
| F16L 55/045 | (2006.01) |
| F16L 41/00 | (2006.01) |
| G01L 19/06 | (2006.01) |
| G01L 19/00 | (2006.01) |

(52) U.S. Cl.
CPC .......... *F16L 55/045* (2013.01); *F16L 41/008* (2013.01); *G01L 19/0609* (2013.01); *G01L 19/0618* (2013.01); *G01L 19/0007* (2013.01)

(58) Field of Classification Search
CPC ....... F16L 55/045; F16L 41/008; F16L 55/02; G01L 19/0609; G01L 19/0618; G01L 19/0007
See application file for complete search history.

(56) References Cited

U.S. PATENT DOCUMENTS

| | | | |
|---|---|---|---|
| 3,540,285 A | 11/1970 | Nicolau et al. | |
| 4,594,877 A | 6/1986 | Kyker | |
| 4,637,000 A * | 1/1987 | Thigpen | G01L 19/0609 367/165 |
| 4,834,108 A * | 5/1989 | Vaillancourt | A61B 5/0215 600/486 |
| 5,228,334 A * | 7/1993 | Stone | G01L 19/0609 73/114.43 |
| 5,236,227 A | 8/1993 | Adams et al. | |
| 5,343,754 A | 9/1994 | Stone | |
| 5,538,293 A | 7/1996 | Kolt | |
| 6,168,230 B1 | 1/2001 | Ono | |
| 6,231,704 B1 | 5/2001 | Carpinetti | |

FOREIGN PATENT DOCUMENTS

| | | |
|---|---|---|
| EP | 0528692 A2 | 2/1993 |
| JP | 2017020891 A | 1/2017 |
| JP | 2017044233 A | 3/2017 |
| WO | 2006076745 A1 | 7/2006 |

OTHER PUBLICATIONS

European Search Report regarding European Patent Application No. 19211776.0 dated May 18, 2020; pp. 1-9.

* cited by examiner

*Primary Examiner* — David Z Huang
(74) *Attorney, Agent, or Firm* — Armstrong Teasdale LLP

(57) ABSTRACT

A snubber includes a head portion, a shank portion, and a threaded portion. The shank portion is attached to the head portion, and the shank portion defines a shank diameter. The threaded portion is attached to the shank portion, and the threaded portion includes an external helical thread wrapped around a central shaft. The external helical thread defines a threaded diameter, and the central shaft defines a central shaft diameter. The shank diameter and the thread diameter are sized such that the shank portion and the threaded portion define at least one fluid flow path when the snubber is installed in a pressure sensor.

28 Claims, 11 Drawing Sheets

SYSTEM AND METHOD FOR A HELICAL PRESSURE SNUBBER

FIELD

The field of the disclosure relates generally to fluid flow systems and, more specifically, to a system and method for a helical pressure snubber.

BACKGROUND

At least some known aircraft include fluid systems, typically hydraulic or pneumatic systems, to channel a fluid, typically air or water, to a plurality of locations within the aircraft. For example, the aircraft typically includes a hydraulic system that channels a hydraulic fluid, typically hydraulic oil or water, to at least the landing gear of the aircraft to control and actuate the landing gear. The hydraulic fluid is maintained at a high pressure and is capable of transmitting a large force with a small volume of fluid. Changes in pressure of the hydraulic system control and actuate the landing gear. The hydraulic system includes a plurality of pressure transducers configured to monitor the pressure of the hydraulic fluid. The hydraulic system also includes a plurality of hydraulic mechanisms, such as valves and/or fluid motive equipment, which control the pressure and movement of hydraulic fluid within the hydraulic system. Opening and closing of valves and/or use of other hydraulic mechanisms within the hydraulic system may cause transient pressure spikes within the system.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

One aspect of the present disclosure includes a snubber including a head portion, a shank portion, and a threaded portion. The shank portion is attached to the head portion, and the shank portion defines a shank diameter. The threaded portion is attached to the shank portion, and the threaded portion includes an external helical thread wrapped around a central shaft. The external helical thread defines a threaded diameter, and the central shaft defines a central shaft diameter. The shank diameter and the thread diameter are sized such that the shank portion and the threaded portion define at least one fluid flow path when the snubber is installed in a pressure sensor.

Another aspect of the present disclosure includes a pressure sensor including a transducer, a fitting, and a snubber. The fitting has a first end defining an opening and a threaded portion therein. The fitting is coupled to the transducer. The threaded portion includes an inner surface and an internal helical thread positioned on the inner surface. The first end further defines at least one notch. The snubber is positioned within the opening of the threaded portion, and includes a head portion, a shank portion, and a threaded portion. The shank portion is attached to the head portion and defines a shank diameter. The threaded portion is attached to the shank portion, and includes an external helical thread wrapped around a central shaft. The external helical thread defines a thread diameter, and the central shaft defines a central shaft diameter. The shank diameter, the thread diameter, and the central shaft diameter are sized such that the notch, the shank portion, and the threaded portion define at least one fluid flow path when the snubber is installed in the fitting.

Yet another aspect of the present disclosure includes a pressure sensor including a transducer, a fitting, and a snubber. The fitting has a first end defining an opening and a threaded portion therein. The fitting is coupled to the transducer. The threaded portion includes an inner surface and an internal helical thread positioned on the inner surface. The snubber is positioned within the opening of the threaded portion, and includes a head portion, a shank portion, and a threaded portion. The head portion defines at least one notch. The shank portion is attached to the head portion and defines a shank diameter. The threaded portion is attached to the shank portion, and includes an external helical thread wrapped around a central shaft. The external helical thread defines a thread diameter, and the central shaft defines a central shaft diameter. The shank diameter, the thread diameter, and the central shaft diameter are sized such that the notch, the shank portion, and the threaded portion define at least one fluid flow path when the snubber is installed in the fitting.

Yet another aspect of the present disclosure includes a method of purging air from a pressure sensor. The pressure sensor includes a transducer and a fitting coupled to the transducer. The method includes providing the pressure sensor including a transducer and a fitting. The fitting has a first end defining an opening and a threaded portion therein. The threaded portion includes an inner surface and an internal helical thread positioned on the inner surface. The method also includes filling the threaded portion of the fitting with a fluid. The method further includes inserting a snubber into the threaded portion. The snubber includes a head portion, a shank portion, and a threaded portion. The shank portion is attached to the head portion. The head portion defines a notch. The shank portion defines a shank diameter. The threaded portion is attached to the shank portion and includes an external helical thread wrapped around a central shaft. The external helical thread defines a thread diameter and the central shaft defines a central shaft diameter. The shank diameter, the thread diameter, and the central shaft diameter are sized such that the notch, the shank portion, and the threaded portion define at least one fluid flow path when the snubber is inserted in the fitting.

Yet another aspect of the present disclosure includes a method of reducing pressure spikes in a transducer. The method includes coupling a pressure sensor to a fluid system. The pressure sensor includes a transducer, a fitting coupled to the transducer, and a snubber positioned within the fitting. The fitting has a first end defining an opening and a threaded portion therein. The threaded portion includes an inner surface and an internal helical thread positioned on the inner surface. The snubber includes a head portion, a shank portion, and a threaded portion. The shank portion is attached to the head portion, and the head portion defines a notch. The shank portion defines a shank diameter. The threaded portion is attached to the shank portion and includes an external helical thread wrapped around a central shaft. The external helical thread defines a thread diameter, and the central shaft defines a central shaft diameter. The shank diameter, the thread diameter, and the central shaft diameter are sized such that the notch, the shank portion, and the threaded portion define at least one fluid flow path when the snubber is inserted in the fitting. The method also includes channeling a flow of a fluid into the at least one fluid flow path. The method further includes measuring the pressure of the flow of the fluid with the pressure sensor. The at least one fluid flow path reduces pressure spikes of the flow of the fluid.

Yet another aspect of the present disclosure includes a method of installing a pressure sensor in a fluid system. The pressure sensor includes a transducer and a fitting coupled to the transducer. The method includes providing the pressure sensor including a transducer and a fitting. The fitting has a first end defining an opening and a threaded portion therein. The threaded portion includes an inner surface and an internal helical thread positioned on the inner surface. The method also includes filling the threaded portion of the fitting with a fluid. The method further includes inserting a snubber into the threaded portion. The snubber includes a head portion, a shank portion, and a threaded portion. The shank portion is attached to the head portion, and the head portion defines a notch. The shank portion defines a shank diameter. The threaded portion is attached to the shank portion. The threaded portion includes an external helical thread wrapped around a central shaft. The external helical thread defines a thread diameter and the central shaft defines a central shaft diameter. The shank diameter, the thread diameter, and the central shaft diameter are sized such that the notch, the shank portion, and the threaded portion define at least one fluid flow path when the snubber is inserted in the fitting. The method also includes coupling the pressure sensor to a fluid system.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

FIG. 7 is a schematic view of the end of the fitting shown in

FIG. 6.

Although specific features of various embodiments may be shown in some drawings and not in others, this is for convenience only. Any feature of any drawing may be referenced and/or claimed in combination with any feature of any other drawing.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

Embodiments of the systems and methods described herein include a pressure sensor including a snubber configured to reduce transient pressure spikes detected by the pressure sensor. Specifically, the pressure sensor also includes a transducer and a fitting coupled to the transducer. The fitting defines a threaded conduit configured to channel a fluid to the transducer. The snubber includes a head portion and a threaded portion. The threaded portion and the threaded conduit define at least one fluid flow path when the snubber is installed in the fitting. The fluid flow paths are substantially smaller than the threaded conduit and have a substantially higher pressure drop than the threaded conduit. Accordingly, the fluid flow paths substantially reduce transient pressure spikes within the transducer and allows the transducer to accurately measure the steady state pressure of the fluid system. As such, the snubber protects the transducer by reducing transient pressure spikes measured by the transducer. Additionally, one of the head portion of the snubber and the fitting define one or more notches configured to channel the fluid to the fluid flow paths.

Figure 1:
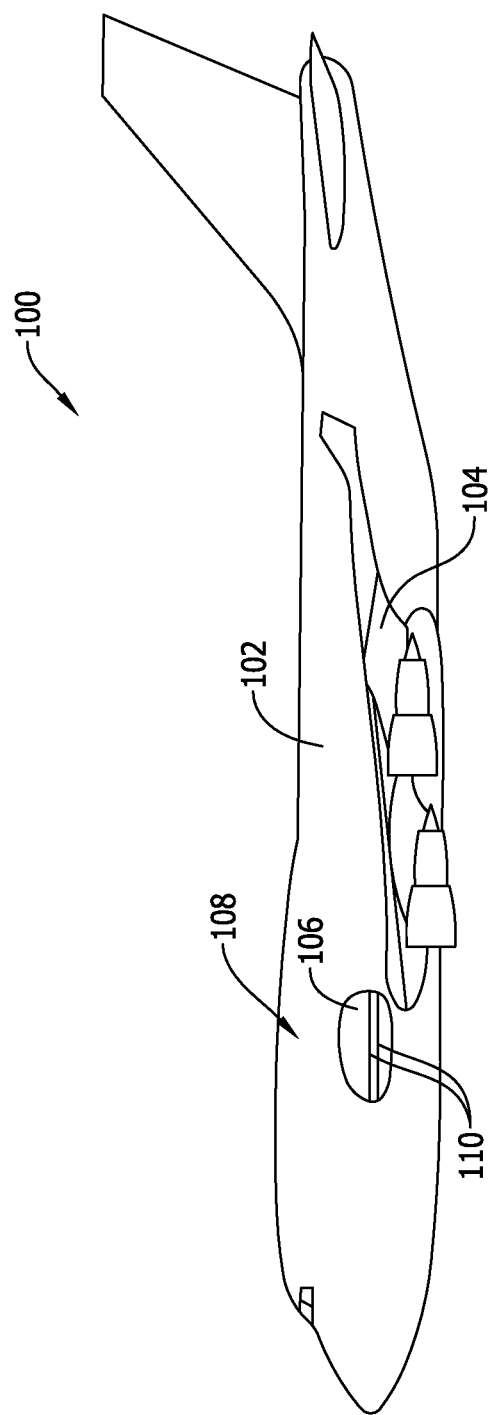
FIG. 1 is a side view illustration of an exemplary vehicle.

FIG. 1 is a side view illustration of a vehicle 100. In the exemplary implementation, vehicle 100 is an aircraft that includes a fuselage 102 and a wing structure 104 extending from fuselage 102. Fuselage 102 and/or wing structure 104 define an interior volume 106, and at least one fluid system 108 is positioned within interior volume 106. Specifically, fluid system 108 includes a plurality of pipes 110 configured to channel at least one fluid through interior volume 106 to different parts of vehicle 100. In the exemplary implementation, fluid system 108 is a hydraulic fluid system configured to control the landing gear of vehicle 100. In the exemplary implementation, the hydraulic fluid is a hydraulic oil. However, fluid system 108 may be configured to channel any type of fluid and may be configured to control any part of vehicle 100.

Figure 2:
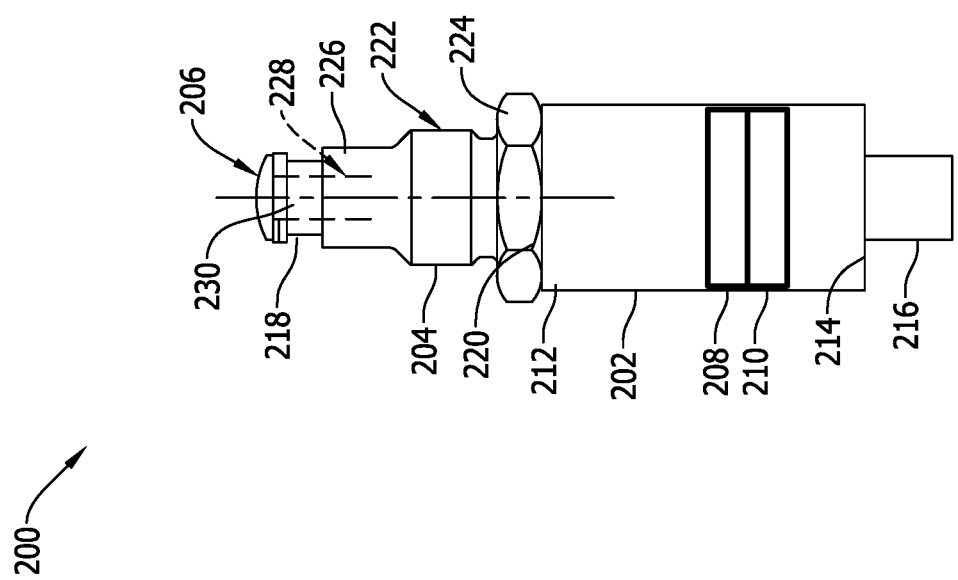
FIG. 2 is a side schematic view of a pressure sensor for use in the vehicle shown in FIG. 1.
Figure 3:
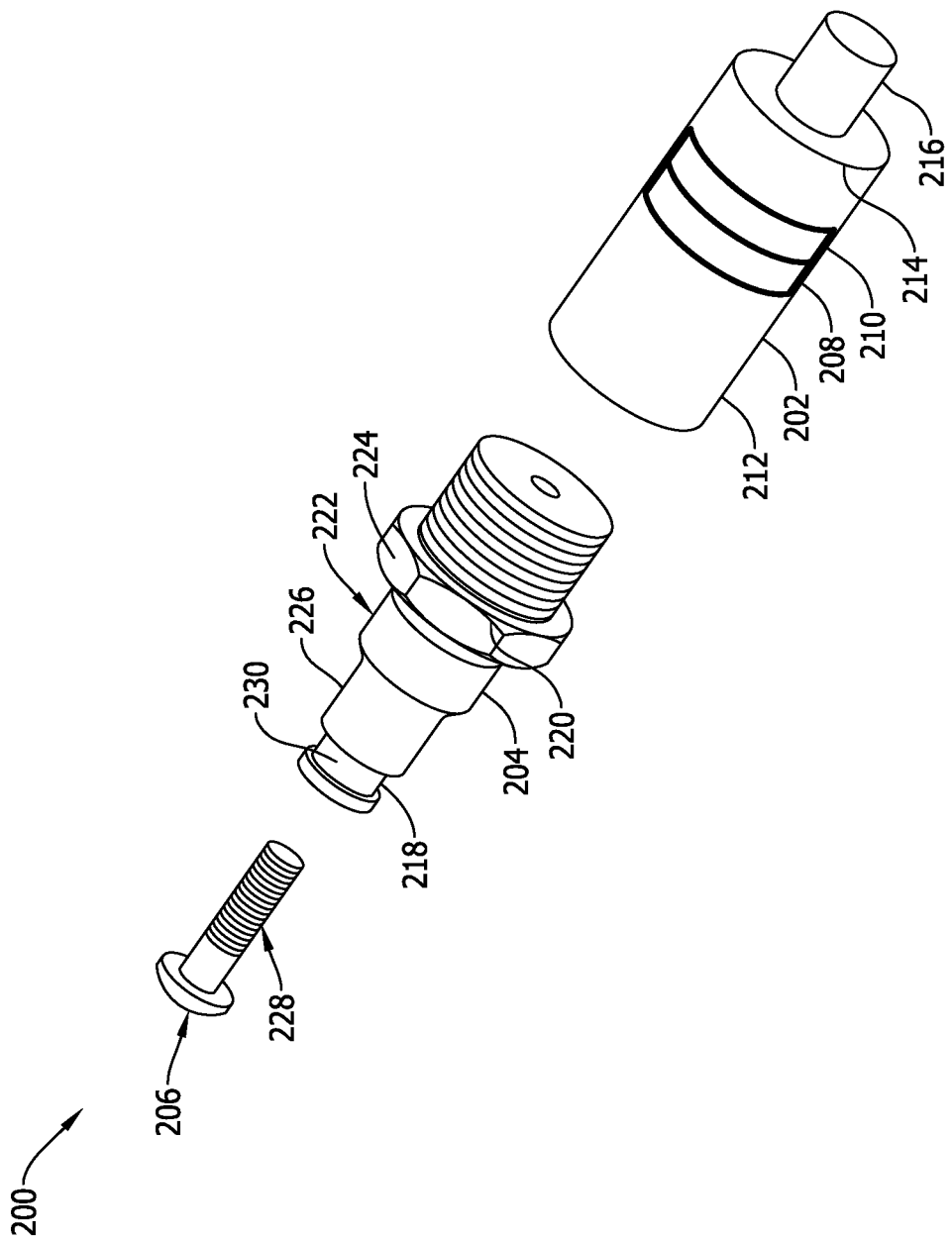
FIG. 3 is an exploded perspective view of a pressure sensor for use in the vehicle shown in FIG. 1.

FIG. 2 is a schematic side view of a pressure sensor 200 for use with fluid system 108. FIG. 3 is an exploded perspective view of pressure sensor 200. Pressure sensor 200 is configured to be coupled to fluid system 108 and is configured to detect a pressure of a fluid within fluid system 108. Pressure sensor 200 includes a transducer 202, a fitting 204, and a snubber 206. Transducer 202 is a pressure transducer configured to detect the pressure of the fluid within fluid system 108. Specifically, transducer 202 is configured to detect the pressure of the fluid and convert the detected pressure into an electrical signal. The electrical signal is sent to an electronic system (not shown), typically a control system, to monitor and control fluid system 108. Transducer 202 detects the pressure of the fluid by physical deformation of a diaphragm 208 within transducer 202, and an electronic component 210 within transducer 202 detects the deformation and sends an electrical signal to the electronic system (not shown) based on the deformation. Transducer 202 has a first end 212 and a second end 214. An electrical coupling 216 configured to send the electrical signal to the electronic system is coupled to second end 214 of transducer 202.

Fitting 204 is configured to couple transducer 202 to fluid system 108, and includes a first end 218 and a second end 220. Second end 220 of fitting 204 is coupled to first end 212 of transducer 202. In the exemplary implementation, fitting 204 includes a body portion 222 and a coupling portion 224. Coupling portion 224 is positioned on second end 220 of fitting 204 and is configured to couple body portion 222 to transducer 202. Specifically, coupling portion 224 includes threading (not shown) configured to attach and retain transducer 202 to fitting 204. In the illustrated implementation, coupling portion 224 is a hex nut. However, coupling portion 224 may be any fastener that couples body portion 222 to transducer 202. In the exemplary implementation, body portion 222 is a quick connect fitting configured to quickly connect transducer 202 to fluid system 108. Specifically, body portion 222 is a cylindrical fitting including a shaped outer surface 226 configured to allow a corresponding fitting (not shown) of fluid system 108 to quickly couple fitting 204 to fluid system 108. However, body portion 222 may be any type of fitting that enables pressure sensor 200 to operate as described herein, including without limitation, a threaded fitting. First end 218 defines an outer groove 221, and a seal 223 circumscribes fitting 204 and is positioned within outer groove 221 Body portion 222 defines a conduit 228 configured to channel the fluid to transducer 202. Specifically, first end 218 of body portion 222 defines a first opening 230, and second end 220 of body portion 222 defines a second opening (not shown). Conduit 228 extends from first opening 230 to the second opening.

Snubber 206 is positioned within conduit 228 and is configured to reduce transient pressure spikes within pressure sensor 200. Specifically, snubber 206 is configured to dampen the pressure exerted by the fluid within fluid system 108 upon transducer 202, such that the maximum transient pressure spikes within fluid system 108 are not transmitted to transducer 202. Specifically, as described below, snubber 206 and body portion 222 define at least one fluid flow path or dampening conduit 232 and 233 (shown in FIG. 4) within conduit 228. Fluid flow paths 232 and 233 are substantially smaller than conduit 228 such that the transient pressure of the fluid within fluid system 108 is reduced or dampened prior to reaching transducer 202. However, fluid flow paths 232 and 233 are configured such that the steady state pressure of the fluid within fluid system 108 is accurately determined by transducer 202. As such, snubber 206 reduces the transient pressure of the fluid within fluid system 108 while accurately determining the steady state pressure of the fluid within fluid system 108.

During operations, transducer 202 is coupled to fitting 204, and snubber 206 is positioned within conduit 228 of fitting 204. Fitting 204 is coupled to fluid system 108 such that the fluid is channeled into fluid flow paths 232 and 233. Transducer 202 determines the pressure of the fluid within fluid system 108 while snubber 206 reduces the transient pressure exerted by the fluid within fluid system 108, protecting transducer 202.

Figure 4:
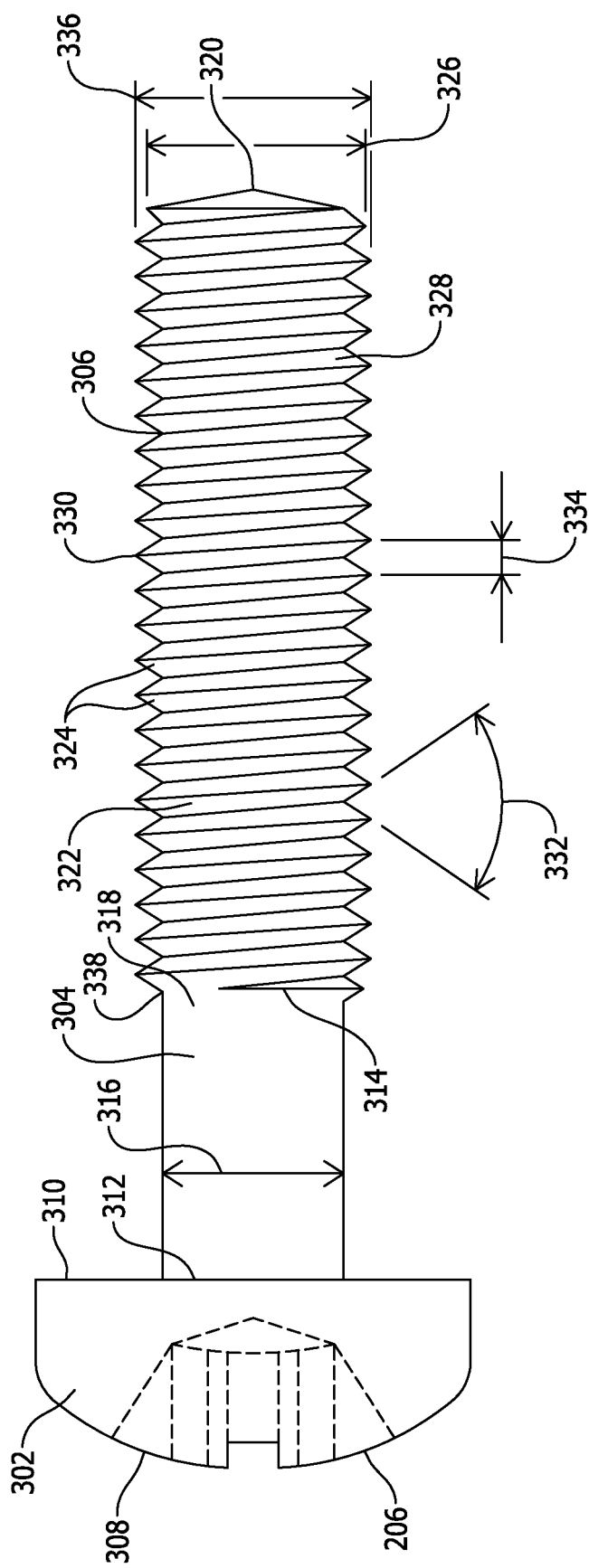
FIG. 4 is a side view of a snubber for use in the pressure sensor shown in FIG. 2.

FIG. 4 is a side view of an exemplary implantation of snubber 206 for use in pressure sensor 200 shown in FIG. 2. Snubber 206 includes a head portion 302, a shank portion 304, and a threaded portion 306. Head portion 302 includes a first end 308 and a second end 310, and defines a driving recess (not shown) on first end 308 configured to allow a tool (not shown), typically a screw driver, to rotate snubber 206. Shank portion 304 includes a first end 312 and a second end 314, and first end 312 of shank portion 304 is coupled to second end 310 of head portion 302. Shank portion 304 is a cylindrical shaft configured to couple head portion 302 to threaded portion 306. Shank portion 304 defines a shank diameter 316. Threaded portion 306 includes a first end 318 and a second end 320, and first end 318 of threaded portion 306 is coupled to second end 314 of shank portion 304. Threaded portion 306 also includes a central shaft 322 and an external helical thread 324. Central shaft 322 defines a central shaft diameter 326 and has an outer surface 328. External helical thread 324 is a helical thread wrapped around outer surface 328 of central shaft 322. External helical thread 324 is a raised helical ridge that defines a crest 330, an external helical thread angle 332, an external helical thread pitch 334, and an external helical thread root 335. Crest 330 defines a thread diameter 336, and threaded portion 306 defines a thread length 338. Shank diameter 316 defines external helical thread root 335 root between adjacent portions of external helical thread 324. Shank diameter 316 and thread diameter 336 are sized such that shank portion 304 and threaded portion 306 define fluid flow paths 232 and 233 when snubber 206 is installed in pressure sensor 200.

Figure 5:
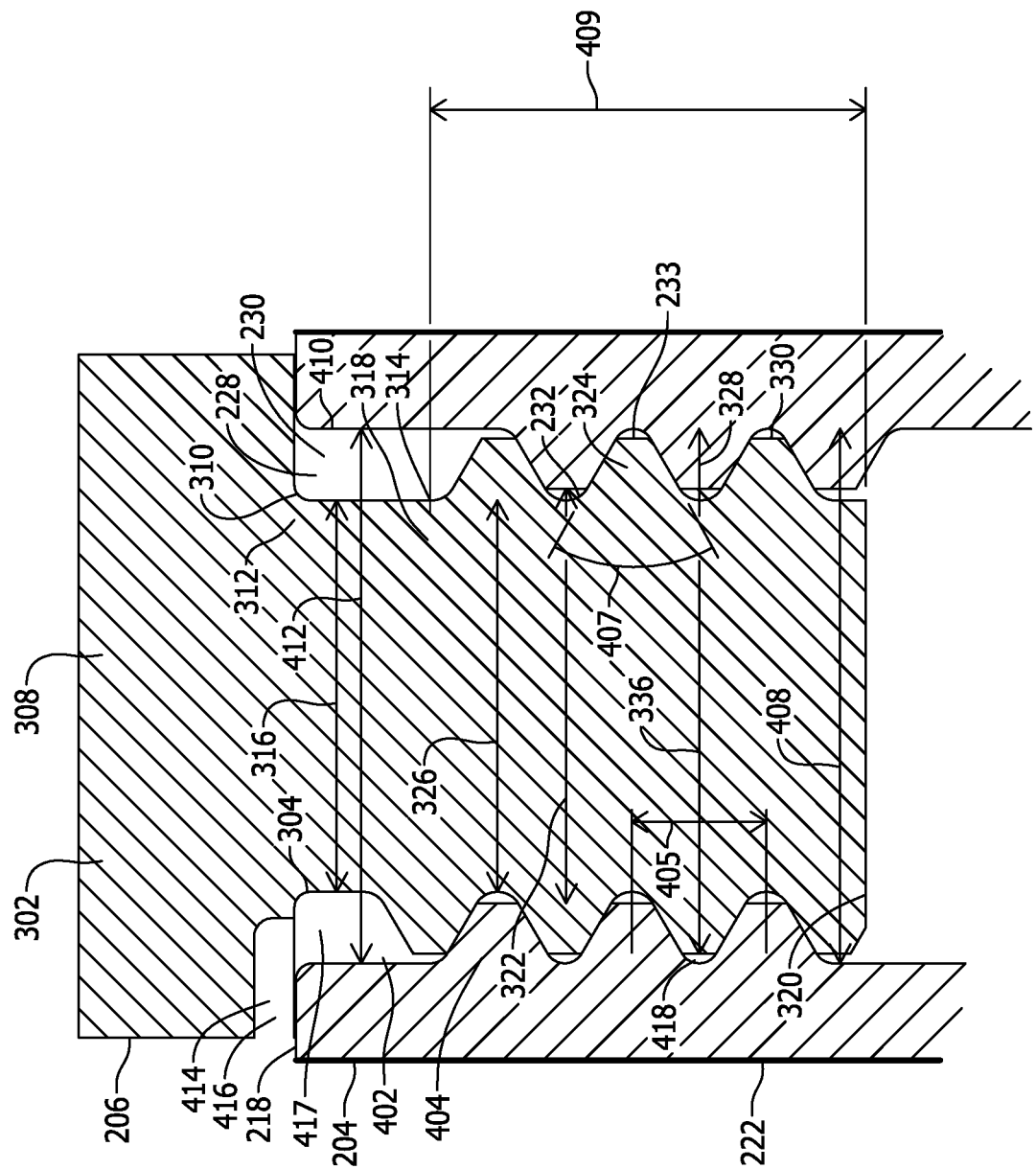
FIG. 5 is a partial cut-away view of the pressure sensor shown in FIG. 2.
Figure 6:
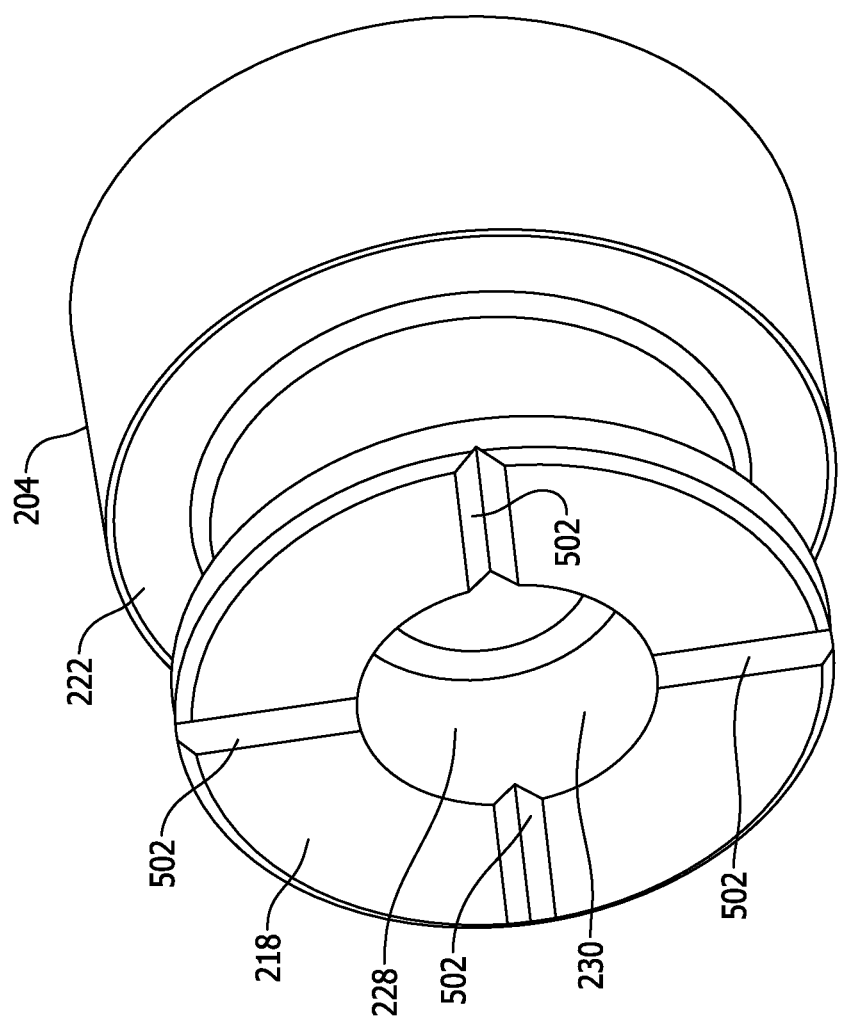
FIG. 6 is a perspective view of an end of a fitting for use in the pressure sensor shown in FIG. 2.
Figure 7:
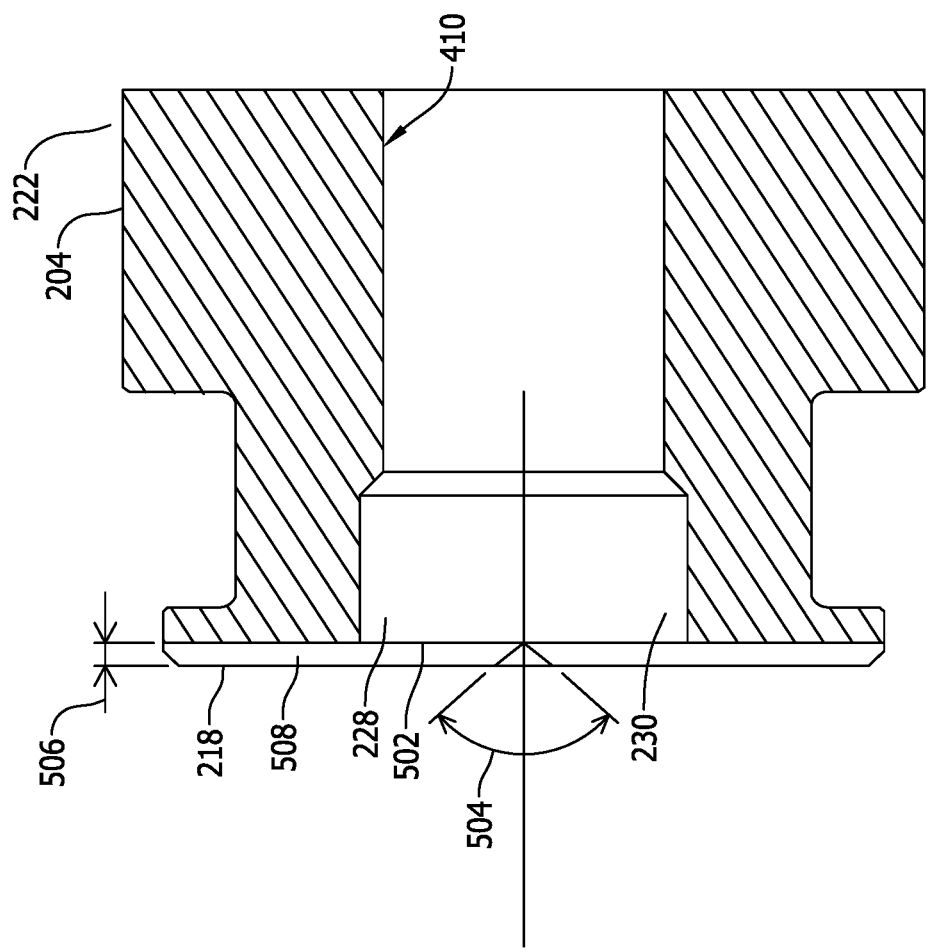

As shown in FIG. 2, in the exemplary implementation, snubber 206 is positioned within conduit 228 such that second end 310 of head portion 302 is flush with first end 218 of fitting 204. As such, in order to channel the fluid into fluid flow paths 232 and 233, one or more notches 414 (shown in FIG. 5), 502 (shown in FIG. 6) are defined respectively in at least one of second end 310 of head portion 302 or first end 218 of fitting 204 and are configured to channel the fluid from fluid system 108 to fluid flow paths 232 and 233. Specifically, as shown in FIG. 5, notch 414 is defined in second end 310 of head portion 302 and is configured to channel the fluid to fluid flow paths 232 and 233. As shown in FIGS. 6 and 7, notches 502 are defined in first end 218 of fitting 204 and are configured to channel the fluid into fluid flow paths 232 and 233 and into pressure sensor 200.

FIG. 5 is a partial cut-away view of pressure sensor 200 shown in FIG. 2. Conduit 228 includes an inner surface 402 and an internal helical thread 404 positioned on inner surface 402. Internal helical thread 404 defines an inner thread diameter 406 and an outer thread diameter 408. Internal helical thread 404 defines an internal helical thread pitch 405, an internal helical thread angle 407, and an internal helical thread length 409. Conduit 228 also defines a non-threaded portion 410 which defines a non-threaded diameter 412. Internal helical thread 404 is configured to receive threaded portion 306 of snubber 206, and non-threaded portion 410 is configured to receive shank portion 304 of snubber 206. In the exemplary implementation, at least one notch 414 is defined in second end 310 of head portion 302 as described above. In alternative implementations, a plurality of notches 414 may be defined in second end 310 of head portion 302, or solely notches 502 may be used. In the illustrated implementation, notch 414 is a rectangular notch that extends radially inward toward shank portion 304. Notch 414, shank portion 304, non-threaded portion 410, internal helical thread 404, external helical thread root 335, and external helical thread 324 are configured to define fluid flow paths 232 and 233.

Specifically, notch 414, shank portion 304, non-threaded portion 410, internal helical thread 404, external helical thread root 335, and external helical thread 324 are configured to define a first fluid flow path 232 and a second fluid flow path 233. First fluid flow path 232 is defined by notch 414, shank portion 304, non-threaded portion 410, internal helical thread 404, and external helical thread root 335 such that first fluid flow path 232 is positioned within external helical thread root 335. Second fluid flow path 233 is defined by notch 414, shank portion 304, non-threaded portion 410, and external helical thread 324 such that second fluid flow path 233 is positioned on crest 330. In the illustrated implementation, notch 414, shank portion 304, non-threaded portion 410, internal helical thread 404, external helical thread root 335, and external helical thread 324 define first fluid flow path 232 and second fluid flow path 233 such that first fluid flow path 232 and second fluid flow path 233 have a double helix configuration around central shaft 322. Two fluid flow paths provides a redundant path in case one of first fluid flow path 232 and second fluid flow path 233 is obstructed.

More specifically, notch 414 and first end 218 of fitting 204 define an entrance 416 of fluid flow paths 232 and 233. Shank portion 304 and non-threaded portion 410 define a second portion 417 of fluid flow paths 232 and 233. Specifically, non-threaded diameter 412 is greater than shank diameter 316, and the volume between shank portion 304 and non-threaded portion 410 defines second portion 417 of fluid flow paths 232 and 233. Internal helical thread 404 and external helical thread 324 define a threaded portion 418 of fluid flow paths 232 and 233. Specifically, inner thread diameter 406 is greater than central shaft diameter 326, and outer thread diameter 408 is greater than thread diameter 336. External helical thread angle 332 substantially corresponds to internal helical thread angle 407, and an external helical thread pitch 334 substantially corresponds to internal helical thread pitch 405. As such, the volume between inner thread diameter 406 and central shaft diameter 326 and the volume between outer thread diameter 408 and thread diameter 336 define threaded portion 418 of fluid flow paths 232 and 233. As shown in FIG. 5, fluid flow paths 232 and 233 have a substantially smaller volume than conduit 228.

During operations, the fluid is channeled from fluid system 108 into entrance 416 of fluid flow paths 232 and 233, and entrance 416 of fluid flow paths 232 and 233 channels the fluid into second portion 417 of fluid flow paths 232 and 233. Second portion 417 of fluid flow paths 232 and 233 then channels the fluid into threaded portion 418 of fluid flow paths 232 and 233 which channels the fluid to transducer 202. As shown in FIG. 5, fluid flow paths 232 and 233 are substantially smaller in volume than conduit 228 and provide more resistance to the flow through fluid flow paths 232 and 233 than through conduit 228 absent snubber 206. Increased resistance to flow of the fluid also increases the pressure drop through fluid flow paths 232 and 233. Increased pressure drop through fluid flow paths 232 and 233 reduces transient pressure spikes within fluid flow paths 232 and 233 by decreasing the pressure of the fluid as it flows through fluid flow paths 232 and 233. However, fluid flow paths 232 and 233 allow static fluid within fluid flow paths 232 and 233, and, as such, the steady state pressure of the fluid is transmitted through fluid flow paths 232 and 233 to transducer 202. Accordingly, fluid flow paths 232 and 233 reduce transient pressure spikes while transmitting the steady state pressure to transducer 202.

In the exemplary implementation, internal helical thread length 409 and thread length 338 are substantially equal. When snubber 206 is fully installed in fitting 204, threaded portion 306 is also fully installed in internal helical thread 404. However, snubber 206 may be partially installed in fitting 204 such that threaded portion 306 is partially installed in internal helical thread 404, shortening fluid flow paths 232 and 233. Shortening fluid flow paths 232 and 233 decreases resistance to the flow of the flow through fluid flow paths 232 and 233, and decreases the pressure drop through fluid flow paths 232 and 233. As such, adjusting the position of snubber 206 within fitting 204 adjusts the pressure drop within fluid flow paths 232 and 233 and increases the range of transient pressure spikes transmitted within fluid flow paths 232 and 233. Accordingly, the range of transient pressure measured by transducer 202 can be tuned by adjusting the position of snubber 206 within fitting 204, protecting transducer 202.

FIG. 6 is a perspective view of first end 218 of fitting 204 for use in pressure sensor 200 shown in FIG. 2. FIG. 7 is a schematic view of first end 218 of fitting 204 shown in FIG. 6. Rather than or in addition to notch 414 defined in second end 310 of head portion 302, one or more notches 502 are defined in first end 218 of fitting 204. In the exemplary implementation, a plurality of notches 502 is defined in first end 218 of fitting 204. In the illustrated implementation, notches 502 are radially extending channels defined in first end 218 of fitting 204 and are configured to channel the fluid into fluid flow paths 232 and 233. However, notches 502 may have any configuration on first end 218 of fitting 204 that enables pressure sensor 200 to operate as described herein. Additionally, in the illustrated implementation, notches 502 define a V-shape and have a notch angle 504 and a notch depth 506. Notches 502 and second end 310 of head portion 302 define an additional or alternative entrance 508 of fluid flow paths 232 and 233. During operations, the fluid is channeled into entrance 508 of fluid flow paths 232 and 233, and entrance 508 of fluid flow paths 232 and 233 channels the fluid into second portion 417 and threaded portion 418 of fluid flow paths 232 and 233 as described above.

Figure 8:
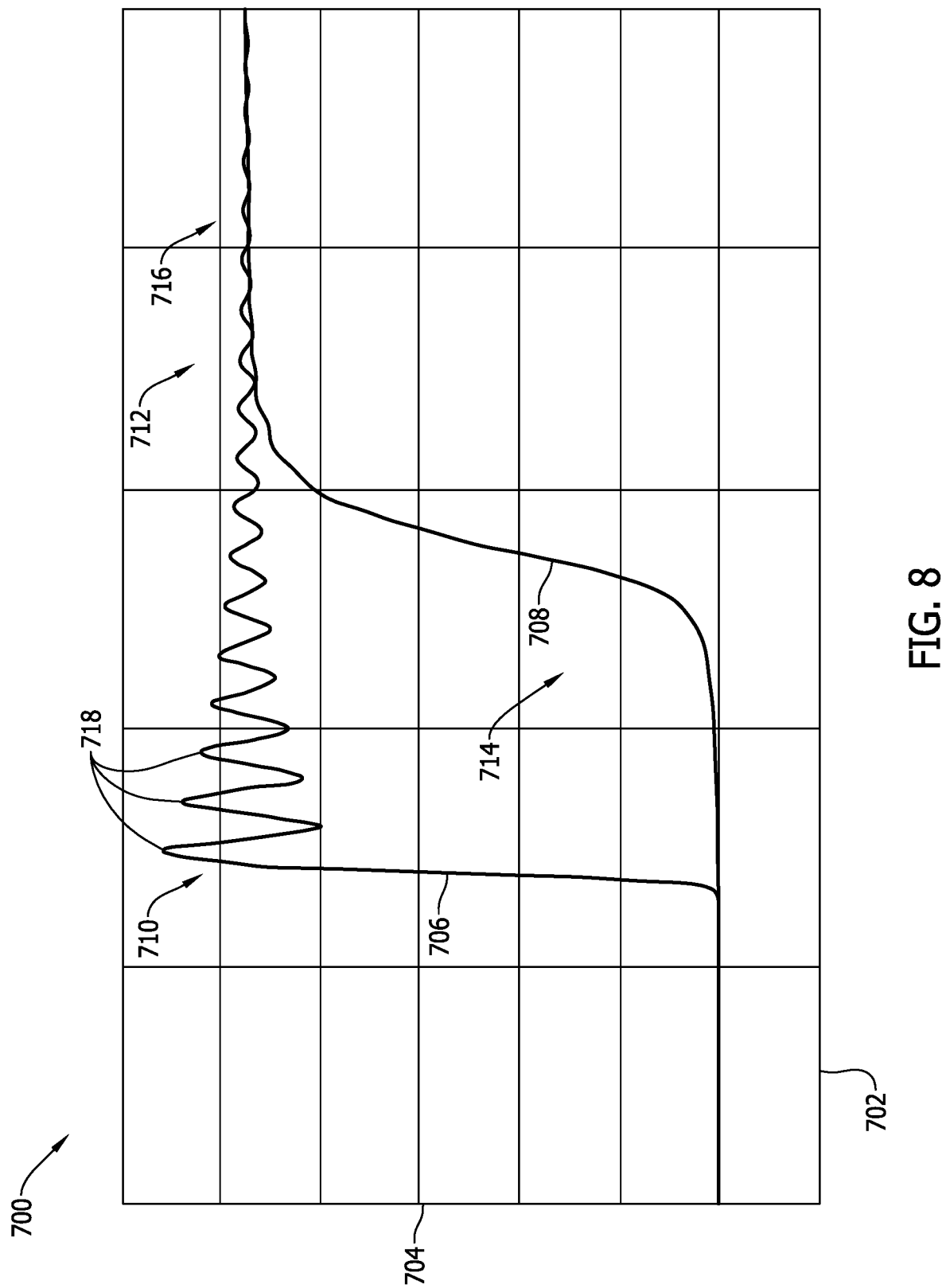
FIG. 8 is a plot of the pressure measured by the pressure sensor shown in FIG. 2.

FIG. 8 is a plot 700 of the pressure measured by pressure sensor 200 shown in FIG. 2 during exemplary operation of fluid system 108. Plot 700 includes an x-axis 702 that displays units of time and a y-axis 704 that displays units of pressure. A first curve 706 plots the pressure measured by a pressure sensor without snubber 206, and a second curve 708 plots the pressure measured by pressure sensor 200 with snubber 206. First curve 706 includes a first transient pressure region 710 and a first steady state pressure region 712, and second curve 708 includes a second transient pressure region 714 and a second steady state pressure region 716. First transient pressure region 710 has a substantially higher peak pressures, or transient pressure spikes, 718 than second transient pressure region 714 while first steady state pressure region 712 has a pressure that is substantially equal to second steady state pressure region 716. As such, snubber 206 reduces the transient pressure spikes 718 measured by transducer 202 while accurately measuring the steady state pressure. Reducing the peak transient pressure below a predetermined pressure value that does not damage transducer 202 protects transducer 202 and increases the life of transducer 202.

Pressure sensor 200 is installed into fluid system 108 by first providing pressure sensor 200 including transducer 202, fitting 204, and snubber 206. Second end 220 of fitting 204 is coupled to first end 212 of transducer 202. Conduit 228 is filled with fluid, such as the same fluid used in fluid system 108, to purge the air from conduit 228 and protect transducer 202. Snubber 206 is positioned within conduit 228 by rotating snubber 206 such that external helical thread 324 engages internal helical thread 404 to form fluid flow paths 232 and 233. The fluid used to purge the air from conduit 228 occupies fluid flow paths 232 and 233. The position of snubber 206 within conduit 228 is adjusted to tune the pressure drop within fluid flow paths 232 and 233. Fitting 204 is attached to a corresponding fitting (not shown) of fluid system 108, coupling transducer 202 and pressure sensor 200 in flow communication within fluid system 108.

Figure 9:
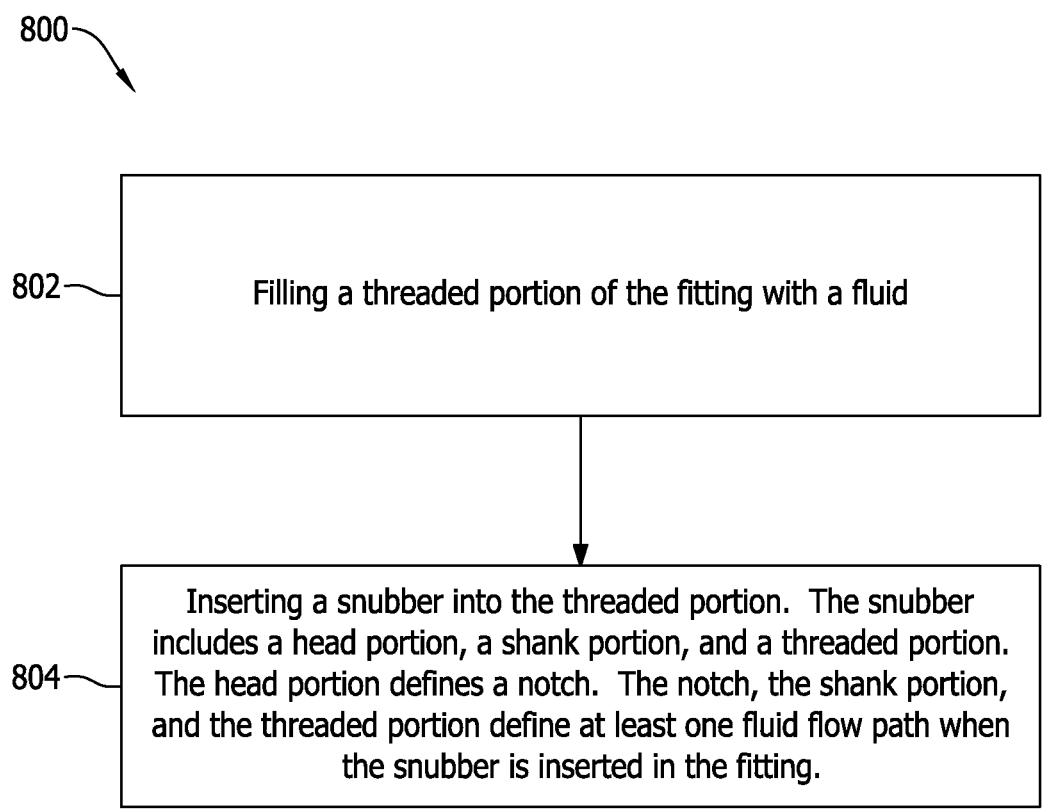
FIG. 9 is a flow diagram of an embodiment of a method of purging air from a transducer.

FIG. 9 is a flow diagram of an example of a method 800 of purging air from a pressure sensor. The pressure sensor including a transducer and a fitting coupled to the transducer. Method 800 includes providing the pressure sensor including a transducer and a fitting. The fitting has a first end defining an opening and a threaded portion therein. The threaded portion includes an inner surface and an internal helical thread positioned on the inner surface. Method 800 also includes filling 802 the threaded portion of the fitting with a fluid. Method 800 further includes inserting 804 a snubber into the threaded portion. The snubber includes a head portion, a shank portion, and a threaded portion. The shank portion is attached to the head portion. The head portion defines a notch. The shank portion defines a shank diameter. The threaded portion is attached to the shank portion and includes an external helical thread wrapped around a central shaft. The external helical thread defines a thread diameter and the central shaft defines a central shaft diameter. The shank diameter, the thread diameter, and the central shaft diameter are sized such that the notch, the shank portion, and the threaded portion define a fluid flow path when the snubber is inserted in the fitting.

Figure 10:
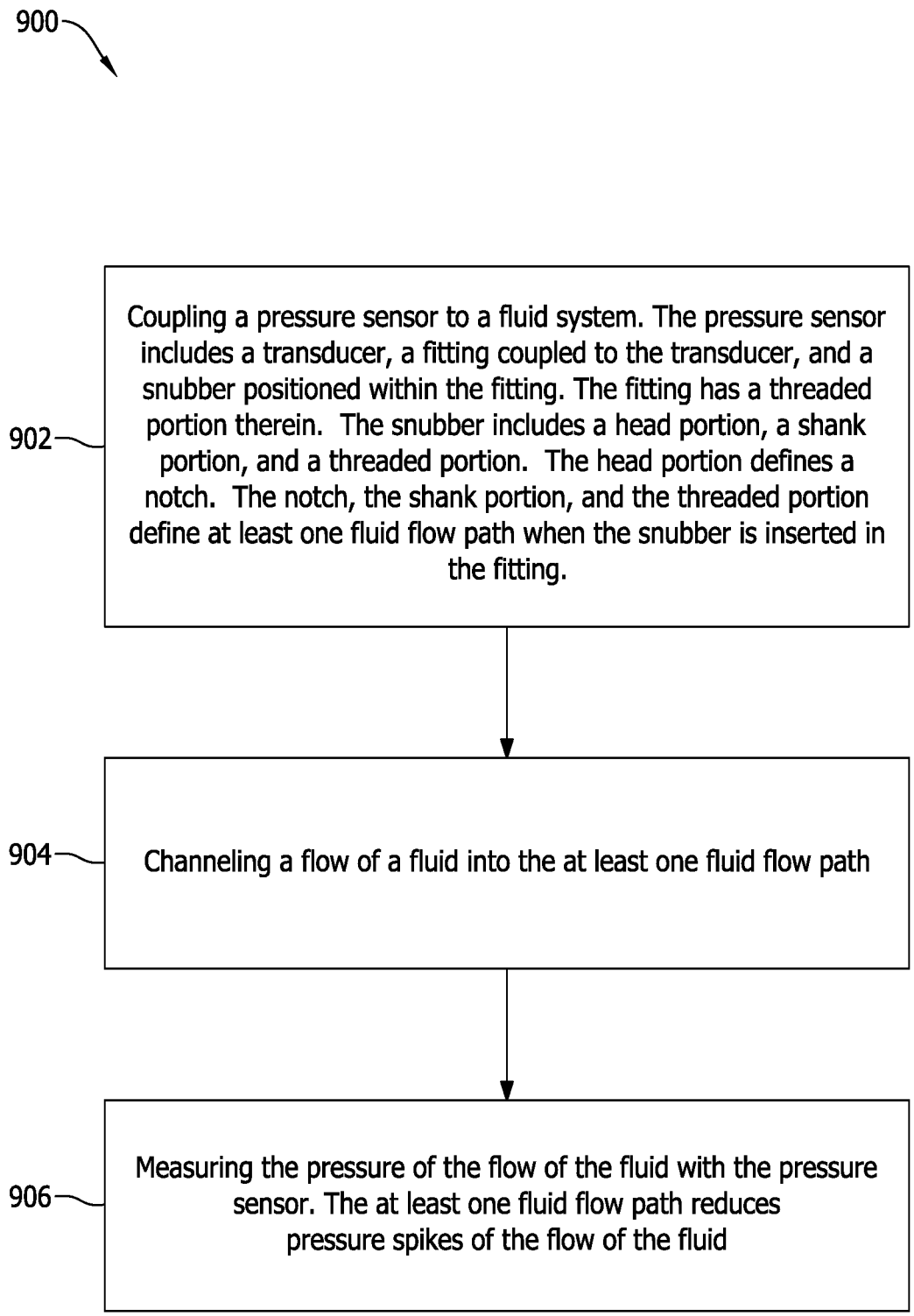
FIG. 10 is a flow diagram of an embodiment of a method of reducing pressure spikes in a transducer.

FIG. 10 is a flow diagram of an example of a method 900 of reducing pressure spikes in a transducer. Method 900 includes coupling 902 a pressure sensor to a fluid system. The pressure sensor includes a transducer, a fitting coupled to the transducer, and a snubber positioned within the fitting. The fitting has a first end defining an opening and a threaded portion therein. The threaded portion includes an inner surface and an internal helical thread positioned on the inner surface. The snubber includes a head portion, a shank portion, and a threaded portion. The shank portion is attached to the head portion, and the head portion defines a notch. The shank portion defines a shank diameter. The threaded portion is attached to the shank portion and includes an external helical thread wrapped around a central shaft. The external helical thread defines a thread diameter, and the central shaft defines a central shaft diameter. The shank diameter, the thread diameter, and the central shaft diameter are sized such that the notch, the shank portion, and the threaded portion define a fluid flow path when the snubber is inserted in the fitting. Method 900 also includes channeling 904 a flow of a fluid into the fluid flow path. Method 900 further includes measuring 906 the pressure of the flow of the fluid with the pressure sensor. The fluid flow path reduces pressure spikes of the flow of the fluid.

Figure 11:
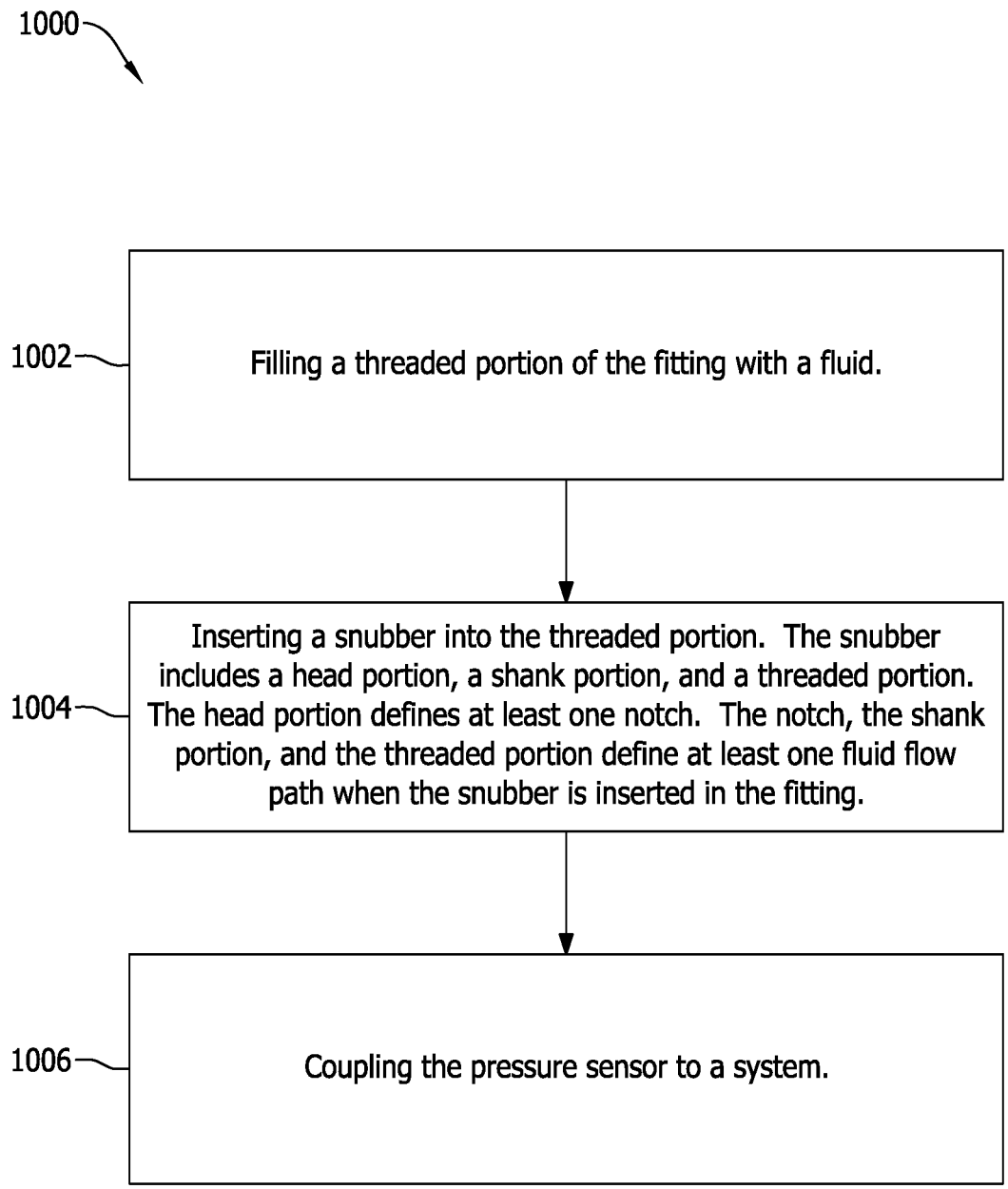
FIG. 11 is a flow diagram of an embodiment of a method of installing a transducer in a fluid system.

FIG. 11 is a flow diagram of an example of a method 1000 of installing a pressure sensor in a fluid system. The pressure sensor includes a transducer and a fitting coupled to the transducer. Method 1000 includes providing the pressure sensor including a transducer and a fitting. The fitting has a first end defining an opening and a threaded portion therein. The threaded portion includes an inner surface and an internal helical thread positioned on the inner surface. Method 1000 also includes filling 1002 the threaded portion of the fitting with a fluid, and more specifically the same fluid used in the fluid system. Method 1000 further includes inserting 1004 a snubber into the threaded portion. The snubber includes a head portion, a shank portion, and a threaded portion. The shank portion is attached to the head portion, and the head portion defines a notch. The shank portion defines a shank diameter. The threaded portion is attached to the shank portion. The threaded portion includes an external helical thread wrapped around a central shaft. The external helical thread defines a thread diameter and the central shaft defines a central shaft diameter. The shank diameter, the thread diameter, and the central shaft diameter are sized such that the notch, the shank portion, and the threaded portion define a fluid flow path when the snubber is inserted in the fitting. Method 1000 also includes coupling 1006 the pressure sensor to a fluid system.

The above described examples of the systems and methods described herein include a pressure sensor including a snubber configured to reduce transient pressure spikes detected by the pressure sensor. Specifically, the pressure sensor also includes a transducer and a fitting coupled to the transducer. The fitting defines a threaded conduit configured to channel a fluid to the transducer. The snubber includes a head portion and a threaded portion. The threaded portion and the threaded conduit define a fluid flow path when the snubber is installed in the fitting. The fluid flow path is substantially smaller than the threaded conduit and has a substantially higher pressure drop than the threaded conduit. Accordingly, the fluid flow path substantially reduces transient pressure spikes within the transducer and allows the transducer to accurately measure the steady state pressure of the fluid system. As such, the snubber protects the transducer by reducing transient pressure spikes measured by the transducer. Additionally, one of the head portion of the snubber and the fitting define one or more notches configured to channel the fluid to the fluid flow path.

The systems and methods described herein are not limited to the specific embodiments described herein, but rather, components of the systems and/or steps of the methods may be utilized independently and separately from other components and/or steps described herein.

Although specific features of various examples of the disclosure may be shown in some drawings and not in others, this is for convenience only. In accordance with the principles of the disclosure, any feature of a drawing may be referenced and/or claimed in combination with any feature of any other drawing.

As used herein, an element or step recited in the singular and proceeded with the word "a" or "an" should be understood as not excluding plural elements or steps unless such exclusion is explicitly recited. Furthermore, references to "one example" of the present disclosure or "an example" are not intended to be interpreted as excluding the existence of additional examples that also incorporate the recited features.

This written description uses examples to disclose various examples, which include the best mode, to enable any person skilled in the art to practice those examples, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A snubber comprising:
 a head portion having a top end and a bottom end, wherein the head portion defines at least one notch in the bottom end of the head portion, wherein the at least one notch extends partially into the head portion from the bottom end of the head portion such that the head portion defines a lip;
a shank portion attached to the head portion, the shank portion defining a shank diameter; and
a snubber threaded portion attached to the shank portion, the snubber threaded portion includes a snubber external helical thread wrapped around a central shaft, the snubber external helical thread defines a snubber threaded diameter and the central shaft defines a central shaft diameter, wherein the shank diameter and the snubber thread diameter are sized such that the shank portion and the snubber threaded portion define at least one fluid flow path when the snubber is installed in a pressure sensor, wherein the pressure sensor, the at least one notch, and the head portion define an entrance to the at least one fluid flow path, wherein the entrance is configured to channel a flow of a fluid to the at least one fluid flow path, and wherein the at least one notch is positioned between the lip and a first end of the fitting when the snubber is installed in a the pressure sensor such that the top end of the head portion completely covers the entrance.

2. The snubber of claim 1, wherein the at least one notch is a rectangular notch.

3. The snubber of claim 1, wherein the at least one notch extends radially inward toward the shank portion.

4. The snubber of claim 1, wherein the head portion defines a plurality of notches in the bottom end of the head portion.

5. The snubber of claim 4, wherein the plurality of notches are a plurality of v-shaped notches.

6. The snubber of claim 4, wherein the plurality of notches are a plurality of radially extending channels.

7. The snubber of claim 4, wherein the plurality of notches are a plurality of rectangular-shaped notches.

8. A pressure sensor comprising:
a transducer;
a fitting having a first end defining an opening and a fitting threaded portion therein, the fitting is coupled to the transducer, the fitting threaded portion includes an inner surface and a fitting internal helical thread positioned on the inner surface, wherein the first end further defines a plurality of notches, wherein the plurality of notches are a plurality of radially extending channels; and
a snubber positioned within the opening of the fitting threaded portion, the snubber comprising:
a head portion;
a shank portion attached to the head portion, the shank portion defines a shank diameter; and
a snubber threaded portion attached to the shank portion, the snubber threaded portion includes a snubber external helical thread wrapped around a central shaft, the snubber external helical thread defines a snubber thread diameter and the central shaft defines a central shaft diameter, wherein the shank diameter, the snubber thread diameter, and the central shaft diameter are sized such that the plurality of notches, the shank portion, and the snubber threaded portion define at least one fluid flow path when the snubber is installed in the fitting.

9. The pressure sensor of claim 8, wherein the plurality of notches are a plurality of v-shaped notches.

10. The pressure sensor of claim 8, wherein the plurality of notches are an entrance to the at least one fluid flow path.

11. The pressure sensor of claim 8, wherein the snubber threaded portion defines an snubber inner thread diameter and an snubber outer thread diameter, the snubber outer thread diameter is greater than a fitting thread diameter such that a volume between the snubber outer thread diameter and the fitting thread diameter partially defines the at least one fluid flow path.

12. The pressure sensor of claim 8, wherein the snubber threaded portion defines a snubber non-threaded portion and a snubber non-threaded diameter, the snubber non-threaded diameter is greater than the shank diameter such that a volume between the snubber non-threaded diameter and the shank diameter partially defines the at least one fluid flow path.

13. A pressure sensor comprising:
a transducer;
a fitting having a first end defining an opening and a fitting threaded portion therein, the fitting threaded portion includes an inner surface and an fitting internal helical thread positioned on the inner surface; and
a snubber positioned within the opening of the fitting, the snubber comprising:
a head portion defining at least one notch;
a shank portion attached to the head portion, the shank portion defines a shank diameter; and
a snubber threaded portion attached to the shank portion, the snubber threaded portion includes a snubber external helical thread wrapped around a central shaft, the snubber external helical thread defines a snubber thread diameter and the central shaft defines a central shaft diameter, wherein the shank diameter, the snubber thread diameter, and the central shaft diameter are sized such that the at least one notch, the shank portion, and the snubber threaded portion define at least one fluid flow path when the snubber is installed in the fitting, wherein the snubber threaded portion defines a snubber inner thread diameter and a snubber outer thread diameter, the snubber outer thread diameter is greater than a fitting thread diameter such that a volume between the snubber outer thread diameter and the fitting thread diameter partially defines the at least one fluid flow path.

14. The pressure sensor of claim 13, wherein the head portion defines a plurality of notches.

15. The pressure sensor of claim 13, wherein the head portion defines one notch.

16. The pressure sensor of claim 15, wherein the notch is a rectangular notch.

17. The pressure sensor of claim 15, wherein the notch extends radially inward toward the shank portion.

18. The pressure sensor of claim 13, wherein the at least one notch is an entrance to the at least one fluid flow path.

19. The pressure sensor of claim 13, wherein the snubber threaded portion defines a snubber non-threaded portion and a snubber non-threaded diameter, the snubber non-threaded diameter is greater than the shank diameter such that a volume between the snubber non-threaded diameter and the shank diameter partially defines the at least one fluid flow path.

20. A method of purging air from a pressure sensor, the pressure sensor including a transducer and a fitting coupled to the transducer, the method comprising:
filling a fitting threaded portion of the fitting with a fluid; and
inserting a snubber into the fitting threaded portion, the snubber includes a head portion, a shank portion, and a snubber threaded portion, the head portion defines at least one notch, wherein the at least one notch, the shank portion, and the snubber threaded portion define at least one fluid flow path when the snubber is inserted in the fitting, wherein the snubber threaded portion defines a snubber inner thread diameter and a snubber outer thread diameter, the snubber outer thread diameter is greater than a fitting thread diameter such that a volume between the snubber outer thread diameter and the fitting thread diameter partially defines the at least one fluid flow path.

21. A method of reducing pressure spikes in a transducer, the method comprising:
coupling a pressure sensor to a fluid system, the pressure sensor including a transducer, a fitting coupled to the transducer, and a snubber positioned within the fitting, the fitting has a fitting threaded portion therein, the snubber includes a head portion, a shank portion, and a snubber threaded portion, the head portion defines at least one notch, the shank portion, and the threaded portion define at least one fluid flow path when the snubber is inserted in the fitting, wherein the snubber threaded portion defines a snubber inner thread diameter and a snubber outer thread diameter, the snubber outer thread diameter is greater than a fitting thread diameter such that a volume between the snubber outer thread diameter and the fitting thread diameter partially defines the at least one fluid flow path;
channeling a flow of a fluid into the at least one fluid flow path; and
measuring the pressure of the flow of the fluid with the pressure sensor, wherein the at least one fluid flow path reduces pressure spikes of the flow of the fluid.

22. The method of claim 21, wherein the head portion defines a plurality of notches.

23. The method of claim 21, wherein the head portion defines one notch.

24. The method of claim 23, wherein the notch is a rectangular notch.

25. The method of claim 23, wherein the notch extends radially inward toward the shank portion.

26. The method of claim 21, wherein the at least one notch is an entrance to the at least one fluid flow path.

27. The method of claim 21, wherein the snubber threaded portion defines a snubber non-threaded portion and a snubber non-threaded diameter, the snubber non-threaded diameter is greater than the shank diameter such that a volume between the snubber non-threaded diameter and the shank diameter partially defines the at least one fluid flow path.

28. A method of installing a pressure sensor in a fluid system, the pressure sensor including a transducer and a fitting coupled to the transducer, the method comprising:
filling a threaded portion of the fitting with fluid;
inserting a snubber into the threaded portion, the snubber includes a head portion, a shank portion, and a snubber threaded portion, the head portion defines a plurality of notches, wherein the plurality of notches, the shank portion, and the snubber threaded portion define at least one fluid flow path when the snubber is inserted in the fitting, wherein the plurality of notches are a plurality of radially extending channels; and
coupling the pressure sensor to the fluid system.

* * * * *